United States Patent
Zhang

(10) Patent No.: US 9,722,867 B2
(45) Date of Patent: Aug. 1, 2017

(54) RESOURCE MANAGEMENT METHOD, RESOURCE MANAGEMENT SYSTEM AND RESOURCE MANAGER

(71) Applicant: HUAWEI TECHNOLOGIES CO., LTD., Shenzhen (CN)

(72) Inventor: Puchao Zhang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 364 days.

(21) Appl. No.: 14/021,546

(22) Filed: Sep. 9, 2013

(65) Prior Publication Data

US 2014/0012995 A1    Jan. 9, 2014

Related U.S. Application Data

(63) Continuation of application No. PCT/CN2011/082178, filed on Nov. 15, 2011.

(30) Foreign Application Priority Data

Mar. 11, 2011    (CN) .......................... 2011 1 0059082

(51) Int. Cl.
  *G06F 15/16* (2006.01)
  *H04L 12/24* (2006.01)
  (Continued)

(52) U.S. Cl.
  CPC ........ *H04L 41/0806* (2013.01); *H04L 47/781* (2013.01); *H04L 47/785* (2013.01)

(58) Field of Classification Search
  CPC ..... H04L 67/10; H04L 5/0058; H04L 5/0091; G06F 15/16; G06F 3/0619; G06F 11/1448
  (Continued)

(56) References Cited

U.S. PATENT DOCUMENTS 8,335,211 B2 * 12/2012 Miyata .............. H04L 29/12066
                                                           370/352
2003/0088544 A1 * 5/2003 Kan .................. G06F 17/30867
  (Continued)

FOREIGN PATENT DOCUMENTS

CN        101304330        11/2008
CN        101510899        8/2009
  (Continued)

OTHER PUBLICATIONS

International Search Report mailed Mar. 1, 2012 in corresponding International Application No. PCT/CN2011/082178.
  (Continued)

*Primary Examiner* — Tesfay Yohannes
(74) *Attorney, Agent, or Firm* — Staas & Halsey LLP

(57) ABSTRACT

A resource management method, a resource management system and a resource manager are disclosed, and the method includes: acquiring a resource allocation request, where the resource allocation request carries a resource requirement list and an access domain name of an application requesting allocation of resources; searching for a resource index locally according to the resource requirement list, and acquiring addresses of at least two available resources, where the at least two available resources are located at different platform as a service layer devices, respectively, and the two available resources both satisfy the resource requirement of the resource requirement list; establishing a correspondence between an address of each available resource and the access domain name; and configuring at least two access routes according to the correspondence, where an access route is used for routing an access request accessing the access domain name to the available resource.

8 Claims, 5 Drawing Sheets

(51) Int. Cl.
*H04L 12/915* (2013.01)
*H04L 12/911* (2013.01)

(58) Field of Classification Search
USPC .............. 709/223, 226; 726/4; 370/352, 353
See application file for complete search history.

(56) References Cited

U.S. PATENT DOCUMENTS

| | | | | |
|---|---|---|---|---|
| 2007/0110047 | A1* | 5/2007 | Kim | G06F 17/30873 370/389 |
| 2007/0153808 | A1* | 7/2007 | Parker | H04L 12/4641 370/395.53 |
| 2007/0294319 | A1* | 12/2007 | Mankad | G06F 11/1662 |
| 2009/0133042 | A1* | 5/2009 | Forin | G06F 9/44521 719/331 |
| 2009/0248786 | A1 | 10/2009 | Richardson et al. | |
| 2009/0327455 | A1 | 12/2009 | Tang | |
| 2010/0191855 | A1* | 7/2010 | Tian | H04L 67/104 709/226 |
| 2010/0228945 | A1* | 9/2010 | Deshpande | G06F 12/0815 711/207 |
| 2012/0278864 | A1* | 11/2012 | Dugeon | H04L 12/2834 726/4 |
| 2013/0091180 | A1* | 4/2013 | Vicat-Blanc-Primet | H04L 41/0816 707/803 |
| 2013/0132546 | A1* | 5/2013 | Vicat-Blanc Primet | H04L 41/0816 709/223 |

FOREIGN PATENT DOCUMENTS

| | | |
|---|---|---|
| CN | 101969475 | 2/2011 |
| CN | 102137014 | 7/2011 |

OTHER PUBLICATIONS

Rekhter, Y. et al., *Address Allocation for Private Internets*, Network Working Group, Request for Comments: 1918, Dated Feb. 1996, Printed Jul. 15, 2016, https://tools.ietf.org/html/rfc1918 (10 pp.).
International Search Report issued Jan. 3, 2012 in corresponding International Patent Application No. PCT/CN2011/082178.
Chinese Search Report issued Jan. 17, 2013 in corresponding Chinese Application No. 201110059082.3.

* cited by examiner

RESOURCE MANAGEMENT METHOD, RESOURCE MANAGEMENT SYSTEM AND RESOURCE MANAGER

CROSS-REFERENCE TO RELATED APPLICATIONS

This application is a continuation of International Application No. PCT/CN2011/082178, filed on Nov. 15, 2011, which claims priority to Chinese Patent Application No. 201110059082.3, filed on Mar. 11, 2011, both of which are hereby incorporated by reference in their entireties.

FIELD OF THE INVENTION

Embodiments of the present invention relate to the field of communications technology, and in particular, to a resource management method, a resource management system and a resource manager.

BACKGROUND OF THE INVENTION

Cloud computing refers to the acquisition of a required service over a network in an on-demand and easily-extensible manner, and may implement resource sharing and on-demand allocation. Because of the existence of vast resources of the cloud computing, the requirement for resource management is that dynamic joining of new resources, on-demand dynamic allocation and dynamic recycling of resources must be implemented.

In the prior art, there are multiple resource management solutions for cloud computing. For example, one solution provides a top-down end-to-end virtualization technology, implements service oriented architecture (Service Oriented Architecture, SOA) of a software service layer, platform as a service layer (Platform as a Service, PaaS) and mirror-based virtualization of data, and infrastructure as a service (Infrastructure as a Service, IaaS) layer storage and virtualization of an operating system.

In the process of researching the prior art, the inventor finds that, the allocation and management solution for cloud computing resources provided in the prior art is based on a grid computing algorithm and the resource granularity is large, and to guarantee high reliability, a high cost is required.

SUMMARY OF THE INVENTION

Embodiments of the present invention provide a resource management method, a resource management system and a resource manager, which may implement highly reliable resource management and allocation at a low cost.

To solve the technical problems, the embodiments of the present invention are implemented through the following technical solutions.

An embodiment of the present invention provides a resource management method, including:

acquiring a resource allocation request, where the resource allocation request carries a resource requirement list and an access domain name of an application requesting allocation of resources;

searching for a resource index locally according to the resource requirement list, and acquiring addresses of at least two available resources, where the at least two available resources are located at different platform as a service layer devices, respectively, and the two available resources both satisfy the resource requirement of the resource requirement list;

establishing a correspondence between an address of each available resource and the access domain name; and configuring at least two access routes according to the correspondence, where an access route is used for routing an access request accessing the access domain name to the available resource.

An embodiment of the present invention further provides a resource manager, including:

a requirement list acquisition unit, configured to acquire a resource allocation request, where the resource allocation request carries a resource requirement list and an access domain name of an application requesting allocation of resources;

an available resource acquisition unit, configured to search for a resource index locally according to the resource requirement list, and acquire addresses of at least two available resources, where the at least two available resources are located at different platform as a service layer devices, respectively, and the two available resources both satisfy the resource requirement of the resource requirement list;

a correspondence establishment unit, configured to establish a correspondence between an address of each available resource and the access domain name; and a route setting unit, configured to configure at least two access routes according to the correspondence, where an access route is used for routing an access request accessing the domain name to the available resource.

An embodiment of the present invention further provides a resource management system, including:

a load balancer, configured to, according to a saved correspondence between a reverse proxy and an access domain name, route an access request to the corresponding reverse proxy; and a reverse proxy, configured to, according to a saved correspondence between an access domain name and an address of an available resource, route the access request to the corresponding available resource;

a resource manager, including:

a requirement list acquisition unit, configured to acquire a resource allocation request, where the resource allocation request carries a resource requirement list and an access domain name of an application requesting allocation of resources;

an available resource acquisition unit, configured to search for a resource index locally according to the resource requirement list, and acquire addresses of at least two available resources, where the at least two available resources are located at different platform as a service layer devices, respectively, and the two available resources both satisfy the resource requirement of the resource requirement list;

a correspondence establishment unit, configured to establish the correspondence between an address of each available resource and the access domain name; and a route setting unit, configured to configure at least two access routes according to the correspondence, where an access route is used for routing an access request accessing the domain name to the available resource.

The route setting unit includes:

a reverse proxy configuration module, configured to save the correspondence between access domain name and an address of each available resource in at least two reverse proxies; and a load balancer configuration module, configured to save the correspondence between each reverse proxy and the access domain name in at least two load balancers.

In the resource management method provided in the embodiment of the present invention, a resource manager acquires at least two available resources according to a resource requirement list, and configures at least two access routes according to a correspondence between an address of each available resource and an access domain name. An access request of a terminal user may reach the available resource through at least two access routes, so as to prevent the use of applications from being affected by a single point failure, thereby achieving high reliability of service implementation. Besides, the available resources acquired by the resource manager are located at different platform as a service layer devices. Compared with the granularity of dividing resources that is an infrastructure as a service layer in the prior art, the granularity of dividing resources in the embodiment of the present invention is a platform as a service layer device, which has smaller resource granularity and a lower implementation cost, so the resource management method provided in the embodiment of the present invention may implement highly reliable resource management and allocation at a low cost.

BRIEF DESCRIPTION OF THE DRAWINGS

To illustrate the technical solutions in the embodiments of the present invention more clearly, the following briefly describes the accompanying drawings required for describing the embodiments or the prior art. Apparently, the accompanying drawings in the following description merely show some embodiments of the present invention, and persons of ordinary skill in the art can derive other drawings from these accompanying drawings without creative efforts.

DETAILED DESCRIPTION OF THE EMBODIMENTS

The following describes the technical solutions according to the embodiments of the present invention with reference to the accompanying drawings in the embodiments of the present invention. Apparently, the embodiments in the following description are merely a part rather than all of the embodiments of the present invention. All other embodiments acquired by persons of ordinary skill in the art based on the embodiments of the present invention without creative efforts shall fall within the protection scope of the present invention.

The present invention provides a resource management method, a resource management system and a resource manager. To better understand the technical solutions of the present invention, the following describes the embodiments of the present invention in detail with reference to the accompanying drawings.

Figure 1:
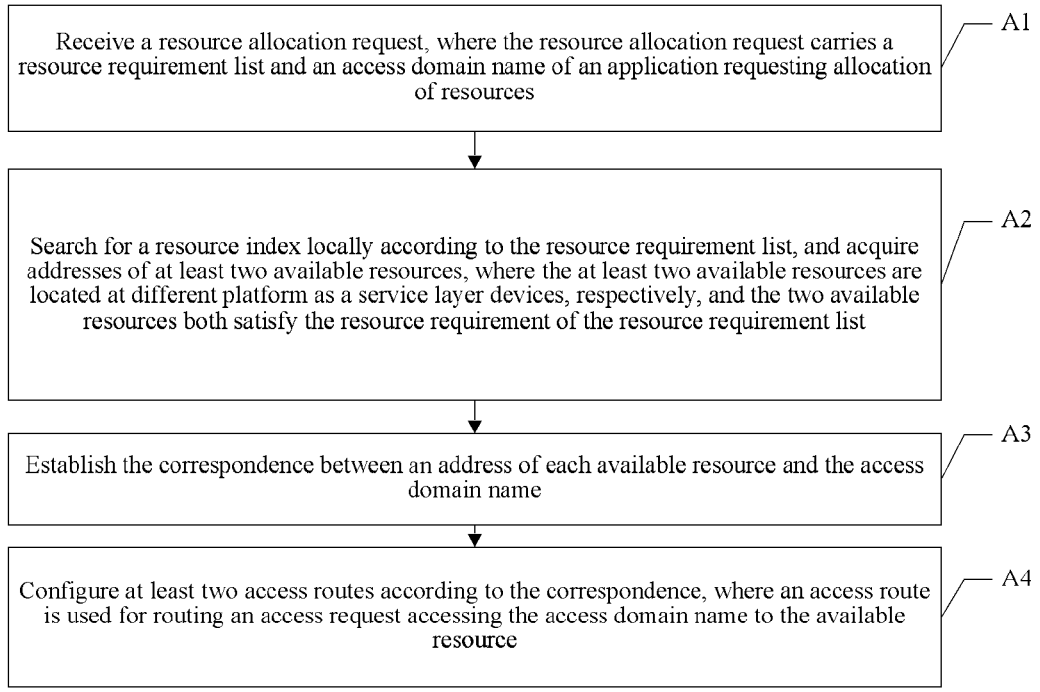
FIG. 1 is a flow chart of a resource management method provided in Embodiment 1 of the present invention.

Referring to FIG. 1, FIG. 1 is a flow chart of a resource management method provided in Embodiment 1 of the present invention.

In the embodiment of the present invention, a service provider (for example, a software developer) may apply for a relevant right from a cloud environment provider (for example, a telecom operator) through a developer website and the like, acquire an application programming interface (Appliance Program Interface, API) of the basic capability in a cloud environment, and develop an innovative service and deploy the service to an application warehouse.

In the process of applying for a relevant right, the service provider may sign a service-level agreement (Service-Level Agreement, SLA) with the cloud environment provider and apply for resources from the cloud environment provider. The resource management method provided in the embodiment of the present invention may include:

A1: Acquire a resource allocation request, where the resource allocation request carries a resource requirement list and an access domain name of an application requesting allocation of resources.

Specifically, a resource manager may acquire the resource allocation request, where the resource allocation request carries the resource requirement list.

For example, the resource requirement list may include a computing resource requirement list (the quantity of TPC-C benchmark transactions that can be accomplished per minute is taken as the unit), a storage resource requirement list (Gbit as the unit), and a database resource requirement list (Gbit as the unit), and the like.

In the embodiment of the present invention, the resource allocation request may be triggered by a maintenance engineer of a cloud environment through a maintenance interface during the application of a new service, that is, resources are applied for the application for the first time.

Besides, in the embodiment of the present invention, a resource application process may be further automatically triggered and new idle resources are allocated to the application, when the resources have already been allocated to the application, but a resource manager determines that the SLA of the application is not satisfied (for example, the connection rate of the application is lower than a preset connection threshold) according to the current execution condition of the application.

It should be pointed out that, the access domain name of the application requesting allocation of resources may not only be stored independently from the resource requirement list, but also can be stored in the resource requirement list, namely, as a part of the resource requirement list. The correspondence between the access domain name and the resource requirement list exists, and the corresponding resource requirement list can be found through the access domain name.

A2: Search for a resource index locally according to the resource requirement list, and acquire addresses of at least two available resources, where the at least two available resources are located at different platform as a service layer devices, respectively, and the two available resources both satisfy the resource requirement of the resource requirement list.

Specifically, the resource manager searches for the locally saved resource index according to the resource requirement list, acquires the addresses of the at least two available resources, where the at least two available resources are located at different PaaS devices, respectively, and different PaaS devices may be located at different IaaS devices. In the embodiment of the present invention, the granularity of dividing resources is PaaS.

Topological information of the resource managed by the resource manager is saved in the resource index, where the topological information includes the correspondence between the resource and the address of the resource, the use state of the resource, and the like. For example, topological information of 10,000 memories managed by the resource manager is saved in the resource index, where the topological information of the memories includes an address of each memory, idle resources of the memories, and the like. The topological information of the resource may be reported to the resource manager by a device (such as a board and a memory) providing the resource when the device is started, and the address of the resource may be an access path of the resource.

A3: Establish the correspondence between an address of each available resource and the access domain name.

Specifically, the resource manager establishes the correspondence between an address of each available resource and the access domain name. The number of the established correspondences is the same as the number of the available resources.

A4: Configure at least two access routes according to the correspondence, where an access route is used for routing an access request accessing the access domain name to the available resource.

Specifically, the resource manager further configures an access route of the access domain name in a route device according to the correspondence, so that the access request of a terminal user for accessing the domain name may be routed to the available resource, and therefore the terminal user may access the available resource through the access domain name.

In the resource management method provided in the embodiment of the present invention, a resource manager acquires at least two available resources according to the resource requirement list, and configures at least two access routes according to the correspondence between an address of each available resource and the access domain name. An access request of a terminal user may reach the available resource through at least two access routes, and prevent the use of an application from being affected by a single point failure, so as to achieve high reliability of service implementation. Besides, the available resources acquired by the resource manager are located at different platform as service layer devices, and different platform as service layer devices are located at different infrastructure as a service layer devices. Compared with the granularity of dividing resources that is an infrastructure as a service layer in the prior art, the granularity of dividing resources in the embodiment of the present invention is a platform as a service layer device, which has small resource granularity and a lower implementation cost, so the resource management method provided in the embodiment of the present invention may implement highly reliable resource management and allocation at a low cost.

In the embodiment of the present invention, the resource allocation request received by the resource manager may carry a service-level agreement of an application requesting allocation, where the service-level agreement may identify the level of the service provided by a service provider. In the embodiment of the present invention, the step of searching for the resource index locally according to the resource requirement list and acquiring addresses of at least two available resources may include: searching for the resource index locally according to a resource requirement list, and acquiring addresses of at least two currently available resources corresponding to the service-level agreement.

In the embodiment of the present invention, by carrying the service-level agreement of the application requesting allocation in the resource allocation request, the resource manager may allocate the resources corresponding to the agreement according to service levels of different applications, so that the demand of the cloud computing in the field of telecom applications can be satisfied, and the adaptability is wider.

Figure 2:
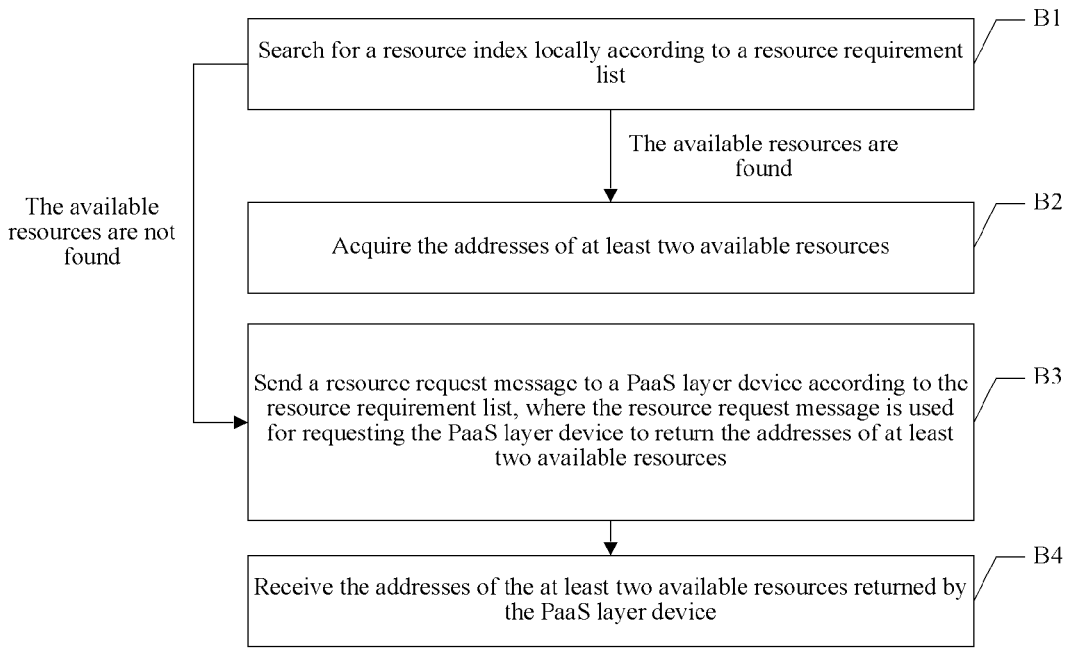
FIG. 2 is a flow chart of a method for a resource manager to search for a resource index locally according to a requirement list provided in Embodiment 1 of the present invention.

Referring to FIG. 2, FIG. 2 is a flow chart of a method for a resource manager to search for a resource index locally according to a requirement list in Embodiment 1 of the present invention.

In the embodiment of the present invention, a resource manager searches for a resource index locally according to a resource requirement list, and acquires addresses of at least two available resources (namely, step A2), which may specifically include:

B1: Search for a resource index locally according to a resource requirement list.

Specifically, the resource index in the resource manager includes topological information of a resource and the use state of the resource. The topological information includes the correspondence between the resource and the address of the resource, and the like.

If the resource manager finds the available resources satisfying the resource requirement of the resource list in the resource index, step B2 is executed; otherwise, step B3 is executed.

B2: If the available resources are found, acquire addresses of at least two available resources.

Specifically, in the case that the available resources are found in the resource index, the resource manager acquires addresses of at least two available resources, and each available resource is located at a different PaaS layer device. The available resources are managed by the resource manager.

B3: If the available resources are not found, send a resource request message to a PaaS layer device according to the resource requirement list, where the resource request message is used for requesting the PaaS layer device to return the addresses of at least two available resources.

Specifically, if the available resources are not found in the resource index, the resource manager sends the resource request message to the PaaS layer device according to the requirement list, where the resource request message is used for requesting the PaaS layer device to return addresses of at least two available resources. The resource request message carries the resource requirement list.

After receiving the resource request message, the PaaS layer device allocates two available resources in an initialized virtual machine (Virtual Machine, VM) pool and an initialized memory pool according to the resource requirement list, and then returns, to the resource manager, a resource response message which carries the addresses of the at least two available resources.

Specifically, first the PaaS layer device acquires PaaS layer resources, that is, acquires two available resources from the initialized VM pool and memory pool, where the available resources satisfy the resource requirement of the resource requirement list. Then, the PaaS layer device acquires IaaS layer resources from an IaaS layer device according to the acquired PaaS layer resources. After applying for the IaaS layer resources, the PaaS layer device returns addresses of two available resources to the resource manager. The addresses of the two available resources returned by the PaaS layer device include the address of a PaaS layer resource accessible for a user, and the correspondence between the address of the PaaS layer resource and the address of a specific IaaS layer device.

B4: Receive the addresses of the at least two available resources returned by the PaaS layer device.

Specifically, the resource manager may receive a resource response message returned by the PaaS layer device, where the resource response message carries the addresses of the at least two available resources.

Figure 3:
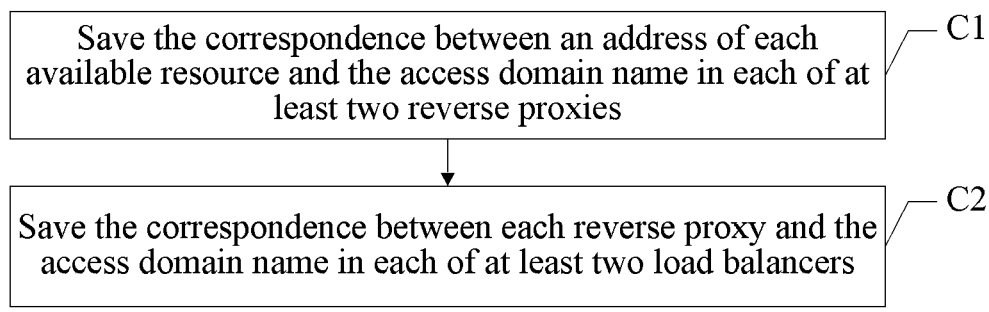
FIG. 3 is a flow chart of a method for a resource manager to configure at least two access routes according to a correspondence between an address of an available resource and an access domain name according to an embodiment of the present invention.

Referring to FIG. 3, FIG. 3 is a flow chart of a method for a resource manager to configure at least two access routes according to the correspondence between an address of an available resource and an access domain name in an embodiment of the present invention.

Furthermore, the process that the resource manager configures at least two access routes (namely, step A4) according to the correspondence between the address of the available resource and the access domain name in Embodiment 1 of the present invention may specifically include:

C1: Save the correspondence between an address of each available resource and the access domain name to each of at least two reverse proxies.

Specifically, the resource manager may manage multiple reverse proxies, and the resource manager saves the correspondence between an address of each available resource and the access domain name in each of at least two reverse proxies.

C2: Save the correspondence between each reverse proxy and the access domain name to each of at least two load balancers.

Specifically, the resource manager may manage multiple load balancers, and the resource manager saves the correspondence between each reverse proxy and the access domain name in each of at least two load balancers, that is, each reverse proxy can be accessed through at least two load balancers.

It should be pointed out that, the foregoing merely provides a method for configuring at least two access routes, and the embodiment of the present invention may further configure a route in other manners.

Figure 4:
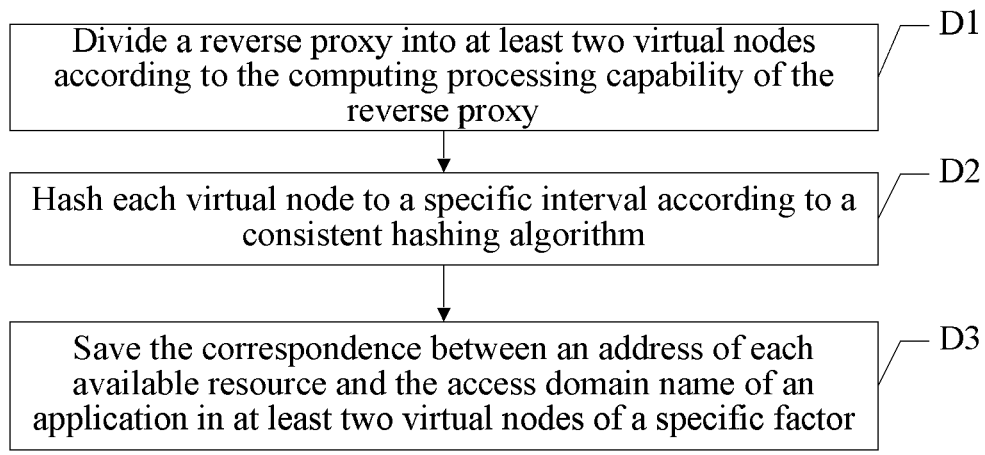
FIG. 4 is a flow chart of a method for establishing correspondences between at least two reverse proxies and an address of an available resource for each available resource in a resource management method according to an embodiment of the present invention.

Referring to FIG. 4, FIG. 4 is a flow chart of a method for establishing the correspondences between at least two reverse proxies and an address of an available resource for each available resource in a resource management method provided in an embodiment of the present invention.

In the embodiment of the present invention, the step (namely, step C1) that the resource manager saves the correspondence between access domain name and the address of each available resource in each of at least two reverse proxies may be implemented in the following manners:

D1: Divide the reverse proxy into at least two virtual nodes according to the computing processing capability of the reverse proxy.

Specifically, the resource manager divides the reverse proxy managed by the resource manager into at least two virtual nodes according to the computing processing capability of the reverse proxy. In the embodiment of the present invention, the computing processing capability of the reverse proxy is not limited, so the computing processing capability of a virtual node is also not limited, and the computing processing capabilities of virtual nodes may be different. In the embodiment of the present invention, the virtual node of the reverse proxy may be understood as the virtual forwarding capability of the reverse proxy.

D2: Hash each virtual node to a specific interval according to a consistent hashing algorithm.

Specifically, the resource manager hashes each virtual node divided by the reverse proxy to the specific interval of a hash ring (Hash Ring) according to the consistent hash algorithm.

In the embodiment of the present invention, the reverse proxy is divided into at least two virtual nodes according to the computing processing capability of the reverse proxy, and each virtual node is hashed to the specific interval according to the consistent hash algorithm, so as to achieve load balance of the reverse proxy when the correspondence is saved, that is, the correspondence is saved in the reverse proxy in a balanced manner according to the computing processing capability of the reverse proxy.

D3: Save the correspondence between an address of each available resource and the access domain name of an application to at least two virtual nodes of a specific factor.

Specifically, the resource manager saves the correspondence between an address of each available resource and the access domain name in at least two virtual nodes of the specific factor.

In the embodiment of the present invention, according to the consistent hash algorithm, the correspondence between an address of each available resource and the access domain name is saved in at least two virtual nodes of the specific factor, and there is certain redundancy in correspondences, so that when a certain reverse proxy fails to work, the work of the failed reverse proxy may be automatically transferred to other reverse proxies, thereby preventing the loss of the correspondence due to a single point failure, and further improving the reliability of a cloud computing system.

Besides, in the embodiment of the present invention, multiple correspondences are saved in each reverse proxy, that is, in this embodiment, each reverse proxy is also virtualized, and each reverse proxy may maintain multiple forwarding lists. Compared with the granularity of dividing resources that is an infrastructure as a service layer in the prior art, the granularity of dividing resources in the embodiment of the present invention is the reverse proxy, so the granularity of resources is smaller, existing resources may be fully utilized, and an implementation cost is low.

Furthermore, in the resource management method provided in the embodiment of the present invention, if a new reverse proxy is added to the resource manager, then after the new reverse proxy is joined, the load service of the reverse proxy with a high load may be automatically shared by the new reverse proxy according to the load condition of existing reverse proxies in the embodiment of the present invention. For example, the virtual node of the newly-added reverse proxy automatically shares the load service of the reverse proxy whose load factor is high.

The forgoing describes the resource management method provided in the embodiment of the present invention in detail. To understand the embodiment of the present invention in detail, the following provides the specific application scenario of a resource management method in an embodiment of the present invention.

Figure 5:
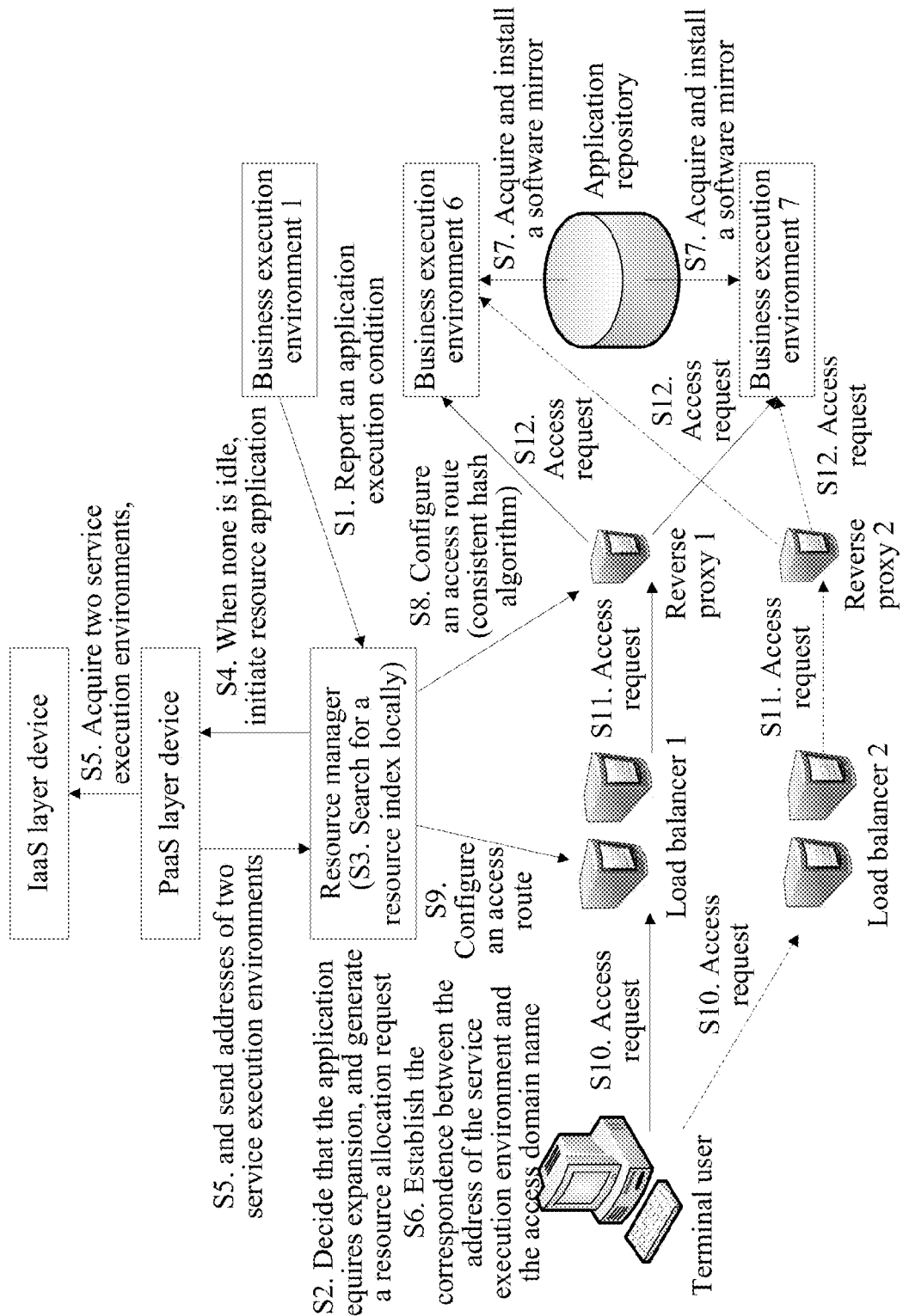
FIG. 5 is an application scenario diagram of a resource management method provided in Embodiment 2 of the present invention.

Referring to FIG. 5, FIG. 5 is an application scenario diagram of a resource management method provided in Embodiment 2 of the present invention.

In an application scenario of this method embodiment, a cloud environment provider allocates resources in a cloud environment to a service provider according to a signed service-level agreement, and according to the allocated resources, service installation and deployment and setting of route information are automatically implemented, so a terminal user may access a service provided by a service provider (for example, access through a webpage).

In the embodiment of the present invention, an application provided by the service provider is a video calling service, and an access domain name of the video calling service being lisi.hae.com is taken as an example for illustration. A terminal user may send an access request to a cloud computing system through lisi.hae.com. The cloud environment provider executes the access request on the back end and returns an execution result to the terminal user.

The resource management method provided in Embodiment 2 of the present inventions mainly includes:

S1: A service execution environment reports the execution condition of an application to a resource manager.

In the embodiment of the present invention, a large number of available resources exist in a cloud computing system. An available resource specifically is the service execution environment in the embodiment of the present invention, where the service execution environment includes a combination of a computing resource and a storage resource. For example, in the service execution environment 1, computing resources are 100,000 TPMCs, and storage resources are 10 Gbits (Gbits). The access domain name of the application running on the service execution environment 1 is lisi.hae.com.

The execution environment of the application provided by a service provider is the service execution environment 1 in the embodiment of the present invention, and the service execution environment 1 may report the execution condition of the application to the resource manager regularly. The execution condition of the application may include a storage resource occupancy rate, (computing, storage and quality of service) response time, a response time delay, a connection rate, and a CPU occupancy rate. For example, the execution condition of the application includes: the storage resource occupancy rate being 90%, the connection rate being 85%, and the CPU occupancy rate being 90%.

S2: Decide that the application requires expansion, and generate a resource allocation request.

Specifically, in the embodiment of the present invention, according to a service-level agreement signed between the service provider and the cloud environment provider and the execution condition of the application, the resource manager determines whether the execution condition of the application satisfies the service-level agreement.

In the embodiment of the present invention, an SLA agreement includes the specification that the storage resource occupancy rate is not higher than 80%, the connection rate is not lower than 95% and the CPU occupancy rate is not higher than 80%, and then the resource manager determines that the execution condition of the application does not satisfy the relevant specification of the service-level agreement, and determines that a new execution environment needs to be added for the application. The resource manager determines that one new service execution environment needs to be added for the application. The newly-added service execution environment includes: the computing resources being 100000 TPMCs, the storage resources being 10 Gbits, and other resources.

The resource allocation request generated by the resource manager carries the access domain name being lisi.hae.com, a resource requirement list, and the like. In the embodiment of the present invention, the resource requirement list is a service execution environment with the computing resources being 100000 TPMCs and the storage resources being 10 Gbits.

S3: Search for a resource index locally according to the resource requirement list.

Specifically, the resource manager searches for the resource index locally according to the resource requirement list. In the embodiment of the present invention, the resource index may be as shown in Table 1.

TABLE 1

| Service Execution Environment | Access Domain Name of Application | Computing Capability | Storage Capability | State | Path |
|---|---|---|---|---|---|
| 1 | lisi.hae.com | 100000 TPMCs | 10 Gbits | occupied | \\sla1 |
| 2 | zhangsan.hae.com | 50000 TPMCs | 5 Gbits | occupied | \\sla2 |
| 3 | none | 50000 TPMCs | 10 Gbits | idle | \\sla3 |
| 4 | zhangsan.hae.com | 100000 TPMCs | 5 Gbits | occupied | \\sla4 |
| 5 | none | 100000 TPMCs | 5 Gbits | idle | \\sla5 |

In the embodiment of the present invention, the resource index of the resource manager includes idle service execution environments 3 and 5, but neither of the service execution environments 3 and 5 can satisfy the resource requirement of the resource requirement list for a video calling service, namely, a service execution environment satisfying a video calling service cannot be found, and the resource manager needs to request the service execution environment from a PaaS layer device, that is, step S4 is executed.

S4: When a service execution environment satisfying the video calling service cannot be found, the resource manager sends a resource request message to a PaaS layer device.

Specifically, the resource manager sends, to the PaaS layer device of the cloud computing system, the resource request message which is used for requesting the PaaS layer device to return addresses of at least two service execution environments, where the resource request message carries the resource requirement list.

S5: The PaaS layer device acquires two service execution environments, and sends the addresses of the at least two service execution environments to the resource manager.

In the embodiment of the present invention, according to the resource requirement list, the PaaS layer device allocates two service execution environments in an initialized VM pool and memory pool, and marks the resources in the VM pool and/or memory pool as an occupied state. Specifically, first the PaaS layer device acquires PaaS layer resources, that is, acquires two pieces of 100000-TPMC computing resources from the initialized VM pool, and acquires two pieces of 10-Gbit storage resources from the initialized memory pool. Then, the PaaS layer device acquires IaaS layer resources from an IaaS layer device according to the acquired PaaS layer resources. After applying for the IaaS layer resources, the PaaS layer device returns the addresses of two service execution environments to the resource manager, where the two service execution environments both include a 100000-TPMC computing resource and a 10-Gbit storage resource.

S6: The resource manager establishes the correspondence between the access domain name of an application and the address of a service execution environment.

Specifically, after receiving the address of the service execution environment returned by the PaaS layer device, the resource manager establishes the correspondence between the access domain name lisi.hae.com of the application and the address of the service execution environment. The correspondence may be saved in the resource index, and an updated resource index is shown in Table 2.

TABLE 2

| Service Execution Environment | Access Domain Name of Application | Computing Capability | Storage Capability | Status | Address |
|---|---|---|---|---|---|
| 1 | lisi.hae.com | 100000 TPMCs | 10 Gbits | occupied | \\sla1 |
| 2 | zhangsan.hae.com | 50000 TPMCs | 5 Gbits | occupied | \\sla2 |
| 3 | none | 50000 TPMCs | 10 Gbits | idle | \\sla3 |
| 4 | zhangsan.hae.com | 100000 TPMCs | 5 Gbits | occupied | \\sla4 |
| 5 | none | 100000 TPMCs | 5 Gbits | idle | \\sla5 |
| 6 | lisi.hae.com | 100000 TPMCs | 10 Gbits | occupied | \\sla6 |
| 7 | lisi.hae.com | 100000 TPMCs | 10 Gbits | occupied | \\sla7 |

In the embodiment of the present invention, a computing resource and a storage resource in the service execution environment may be accessed through the address of the service execution environment.

S7: Acquire and install a software mirror of the application.

Specifically, after acquiring the service execution environments (namely, service execution environments 6 and 7), the resource manager acquires the software mirror corresponding to the application (a video calling service) from a service software warehouse, and installs the software mirror in the service execution environments 6 and 7. The software mirror of the application may be stored in the service software warehouse by a service provider in advance.

S8: The resource manager configures an access route for a reverse proxy.

In the embodiment of the present invention, the reverse proxy may maintain multiple correspondences between an access domain name of an application and a service execution environment. The process that the resource manager configures the route for the reverse proxy may specifically include: saving the correspondences between an address of each service execution environment and the access domain name in each of at least two reverse proxies according to a consistent hash algorithm. After the route is configured, each correspondence is saved in each of at least two reverse proxies, and an access request accessing the domain name may at least be forwarded to the service execution environment through two reverse proxies.

In the embodiment of the present invention, the resource manager saves the correspondence between the access domain name lisi.hae.com and the address \\sla6 of the service execution environment 6 in each of the reverse proxy 1 and the reverse proxy 2. The reverse proxy 1 further saves the correspondence between the access domain name lisi.hae.com and the address \\sla7 of the service execution environment 7. The correspondence saved in the reverse proxy 1 may be as shown in Table 3.

TABLE 3

| Route Number | Access Domain Name of Application | Address of Service Execution Environment |
|---|---|---|
| 1 | zhangsan.hae.com | \\sla2 |
| 2 | lisi.hae.com | \\sla6 |
| 3 | lisi.hae.com | \\sla7 |

In the embodiment of the present invention, when configuring the route in the reverse proxy, the resource manager first divides the reverse proxy into at least two virtual nodes according to the computing processing capability of the reverse proxy. In the embodiment of the present invention, the reverse proxy is divided according to the quantity of TPC-C benchmark transactions that can be accomplished per minute (Transactions Per Minute, TPMC). For example, a reverse proxy of 100,000 TPMCs is divided into 10 virtual nodes, and each virtual node has the computing capability of 10,000 TPMCs.

After the virtual nodes are obtained by the dividing, the resource manager hashes each virtual node to a specific interval according to the consistent hash algorithm, and then saves each correspondence between a reverse proxy and an address of an available resource in at least two virtual nodes of a specific factor.

Figure 6:
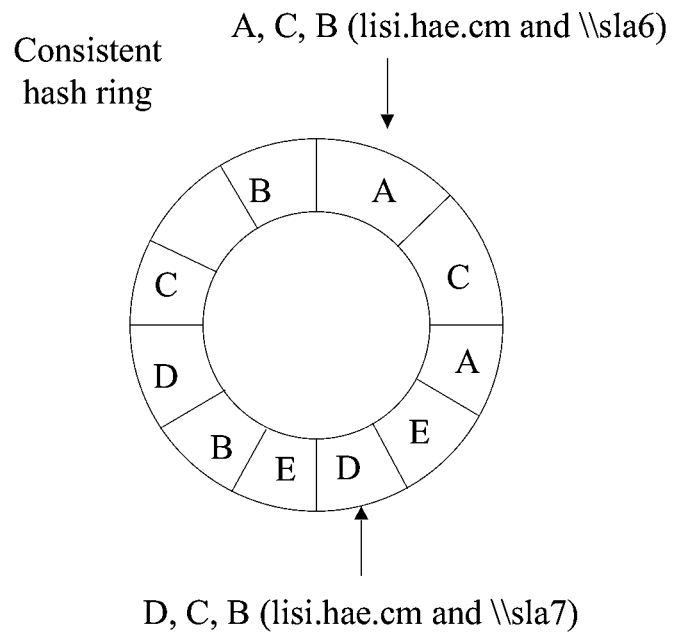
FIG. 6 is a schematic diagram of a hash ring according to an embodiment of the present invention.

As shown in FIG. 6, the reverse proxy 1 is divided into virtual nodes A, B and C according to the computing processing capability of the reverse proxy 1, and the reverse proxy 2 is divided into virtual nodes D and E according to the computing processing capability of the reverse proxy 2. Each virtual node is hashed to the specific interval of a hash ring according to the consistent hash algorithm, where the correspondence between the access domain name lisi.hae.com of the application and the service execution environment 6 is saved in the virtual nodes A, C and B, and the correspondence between the access domain name lisi.hae.com and the service execution environment 7 is saved in the virtual nodes B, C and D. Merely examples are shown, and other correspondences between the access domain name of the application and an execution environment are saved in the specific interval of the hash ring.

S9: Configure an access route for a load balancer.

In the embodiment of the present invention, after configuring the access route for the reverse proxy, the resource manager further configures an access route for a load balancer, where the load balancer is a two-node device.

Specifically, the resource manager saves each correspondence between a reverse proxy and an access domain name of an application in each of at least two load balancers. After the route is configured, the access request accessing the domain name may at least be forwarded to the reverse proxy through two load balancers.

In the embodiment of the present invention, the correspondence between the access domain name lisi.hae.com and the reverse proxy 1 is saved in the load balancer 1 and the load balancer 2, and the correspondence between the access domain name lisi.hae.com and the reverse proxy 2 is saved in the load balancer 1 and the load balancer 2. The correspondence saved in the load balancer 1 is shown in Table 4.

TABLE 4

| Route Number | Access Domain Name of Application | Reverse Proxy |
|---|---|---|
| 1 | zhangsan.hae.com | reverse proxy 1 |
| 2 | lisi.hae.com | reverse proxy 1 |
| 3 | lisi.hae.com | reverse proxy 2 |

S10: A terminal user accesses lisi.hae.com.

Specifically, the terminal user accesses the access domain name lisi.hae.com provided by the service provider.

S11-S12: The load balancer and the proxy node routes the access request.

Specifically, the load balancer 1 routes the access request accessing lisi.hae.com to the reverse proxy 1 or the reverse proxy 2, the reverse proxy 1 or the reverse proxy 2 may route the access request to the service execution environment 6 or the service execution environment 7 according to the saved correspondence, the service execution environment 6 or 7 executes the corresponding task, and returns an execution result to the terminal user. The dotted line in the figure represents one of the optional paths of the access request.

The embodiment of the present invention provides a solution for the resource search and allocation method in a telecom cloud environment at a low cost and with high reliability. Particularly, the dynamic maintenance of the relationship between the service execution environment and the reverse proxy in the cloud computing is solved by introducing the consistent hash algorithm, so that guarantee load balance and prevent the loss of relationship data.

The resource management method provided in the embodiment of the present invention is illustrated in detail above, and an embodiment of the present invention further provides a device corresponding to the forgoing resource management method.

Figure 7:
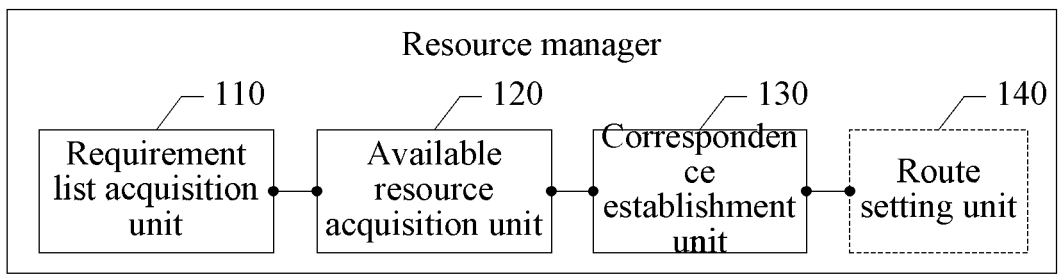
FIG. 7 is a schematic structural diagram of a resource manager provided in Embodiment 3 of the present invention.

Referring to FIG. 7, FIG. 7 is a schematic structural diagram of a resource manager provided in Embodiment 3 of the present invention.

The resource manager provided in Embodiment 3 of the present invention includes:

a requirement list acquisition unit 110, configured to acquire a resource allocation request, where the resource allocation request carries a resource requirement list and an access domain name of an application requesting allocation of resources;

an available resource acquisition unit 120, configured to, according to the resource requirement list, search for a resource index locally, and acquire addresses of at least two available resources, where the at least two available resources are located at different infrastructure as service layer devices, respectively, and the two available resources both satisfy the resource requirement of the resource requirement list;

a correspondence establishment unit 130, configured to establish a correspondence between an address of each available resource and an access domain name; and a route setting unit 140, configured to configure at least two access routes according to the correspondence, where an access route is used for routing an access request accessing the domain name to the available resource.

The resource manager provided in Embodiment 3 of the present invention may be used in the corresponding resource management method in Embodiment 1, and for details, reference may be made to the forgoing description in Embodiment 1.

Figure 8:
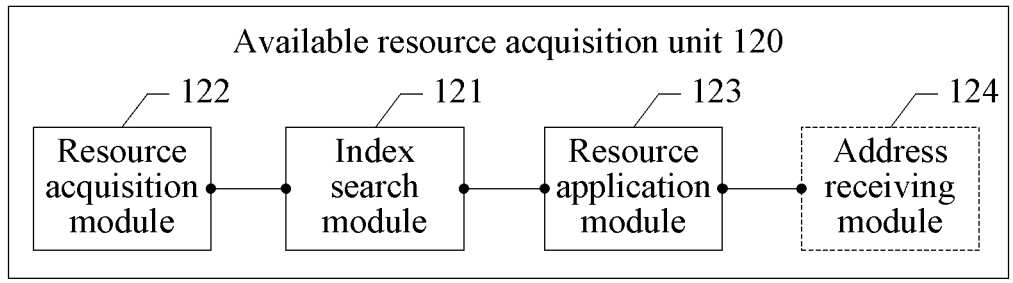
FIG. 8 is a schematic structural diagram of an available resource acquisition unit in the resource manager provided in Embodiment 3 of the present invention.

Referring to FIG. 8, FIG. 8 is a schematic structural diagram of an available resource acquisition unit in the resource manager provided in Embodiment 3 of the present invention.

Furthermore, in the embodiment of the present invention, the available resource acquisition unit 120 may include:

an index search module 121, configured to search for the resource index locally according to the resource requirement list;

a resource acquisition module 122, configured to, if the available resources are found, acquire the addresses of at least two available resources, where the at least two available resources are located at different platform as a service layer devices, respectively;

a resource application module 123, configured to, if the available resources is not found, send a resource request message to a platform as a service layer device according to the resource requirement list, where the resource request message is used for requesting the platform as a service layer device to return the addresses of at least two available resources; and an address receiving module 124, configured to receive the addresses of the at least two available resources returned by the platform as a service layer device.

In the resource manager provided in the embodiment of the present invention, the resource allocation request received by the requirement list acquisition unit 110 further carries a service-level agreement of an application requesting allocation. That the available resource acquisition unit 120 searches for the resource index locally according to the resource requirement list, and acquires the addresses of the at least two available resources specifically is: the available resource acquisition unit 120 searches for the resource index locally according to a resource requirement list, and acquires the addresses of at least two currently available resources corresponding to the service-level agreement.

Figure 9:
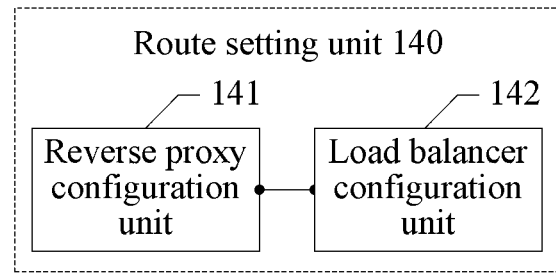
FIG. 9 is a schematic structural diagram of a route setting unit 140 in the resource manager provided in Embodiment 3 of the present invention.

Referring to FIG. 9, FIG. 9 is a schematic structural diagram of a route setting unit 140 in the resource manager provided in Embodiment 3 of the present invention.

Furthermore, in the resource manager provided in the embodiment of the present invention, the route setting unit 140 includes:

a reverse proxy configuration module 141, configured to save the correspondence between the access domain name and the address of each available resource in each of at least two reverse proxies; and a load balancer configuration module 142, configured to save the correspondence between each reverse proxy and the access domain name in each of at least two load balancers.

Figure 10:
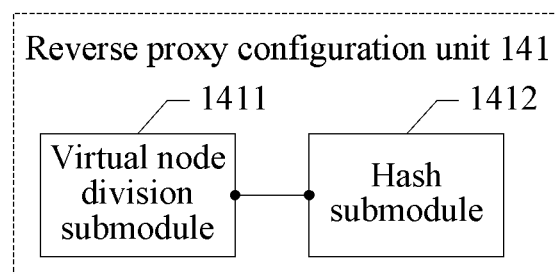
FIG. 10 is a structural schematic diagram of a reverse proxy configuration module in a resource manager according to an embodiment of the present invention.

Referring to FIG. 10, FIG. 10 is a structural schematic diagram of a reverse proxy configuration module in a resource manager according to an embodiment of the present invention.

Furthermore, in the resource manager provided in the embodiment of the present invention, the reverse proxy configuration module 141 includes:

a virtual node division submodule 1411, configured to divide a reverse proxy into at least two virtual nodes according to the computing processing capability of the reverse proxy; and a hash submodule 1412, configured to hash each virtual node to a specific interval according to a consistent hash algorithm, and save the correspondence between an address of each available resource and the access domain name in at least two virtual nodes of a specific factor.

In the embodiment of the present invention, the resource manager saves multiple correspondences between the access domain name and the address of the available resource in each reverse proxy, that is, in this embodiment, each reverse proxy is also virtualized, and each reverse proxy may maintain multiple forwarding lists. Compared with the granularity of dividing resources that is an infrastructure as service layer in the prior art, the granularity of dividing resources is a reverse proxy when the resource manager provided in the embodiment of the present invention divides resources, so resource granularity is smaller, existing resources can be fully utilized, and a cost is low.

In the embodiment of the present invention, according to the consistent hash algorithm, the correspondence between an address of each available resource and the access domain name is saved in at least two virtual nodes of the specific factor, and certain redundancy of the correspondence exists so that when a certain reverse proxy fails to work, the work of the failed reverse proxy is automatically transferred to other reverse proxies, so as to prevent the loss of the correspondence due to a single point failure, and further improve the reliability of a cloud computing system.

It should be noted that, the content such as information interaction and execution processes of units in the resource manager is based on the same concept with the method embodiments of the present invention, and for the specific content, reference may be made to the illustration in FIG. 1 to FIG. 6 of the method embodiments of the present invention, and details are not repeated again herein.

Figure 11:
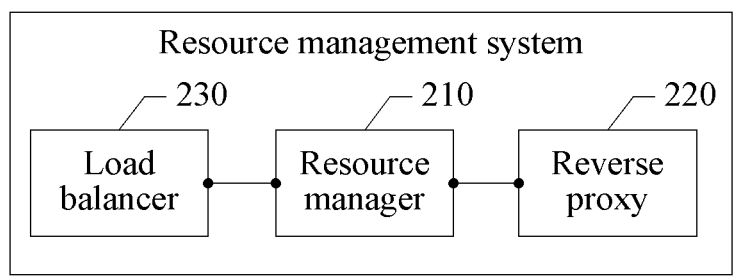
FIG. 11 is a schematic structural diagram of a resource management system provided in Embodiment 4 of the present invention.

Referring to FIG. 11, FIG. 11 is a schematic structural diagram of a resource management system provided in Embodiment 4 of the present invention.

An embodiment of the present invention further provides a resource management system, where the resource management system includes: a resource manager 210, a reverse proxy 220 and a load balancer 230.

The load balancer 230 is configured to route an access request to a corresponding reverse proxy according to a saved correspondence between a reverse proxy and an access domain name, where the reverse proxy is configured to route the access request to a corresponding available resource according to a saved correspondence between an access domain name and an address of an available resource.

The resource manager 210 includes:

a requirement list acquisition unit, configured to acquire a resource allocation request, where the resource allocation request carries a resource requirement list and an access domain name of an application requesting allocation of resources;

an available resource acquisition unit, configured to, according to the resource requirement list, search for a resource index locally, and acquire addresses of at least two available resources, where the at least two available resources are located at different platform as a service layer devices, respectively, and the two available resources both satisfy the resource requirement of the resource requirement list;

a correspondence establishment unit, configured to establish the correspondence between an address of each available resource and the access domain name; and a route setting unit, configured to configure at least two access routes according to the correspondence, where an access route is used for routing an access request accessing the domain name to the above available resource.

The route setting unit includes:

a reverse proxy configuration module, configured to save the correspondence between the access domain name and the address of each available resource in each of at least two reverse proxies; and a load balancer configuration module, configured to save the correspondence between each reverse proxy and the access domain name in each of at least two load balancers.

Furthermore, the reverse proxy configuration module may include:

a virtual node division submodule, configured to divide a reverse proxy into at least two virtual nodes according to the computing processing capability of the reverse proxy; and a hash submodule, configured to hash each virtual node to a specific interval according to a consistent hash algorithm, and save the correspondence between an address of each available resource and the access domain name in at least two virtual nodes of a specific factor.

In the resource management system provided in the embodiment of the present invention, the resource manager saves multiple correspondences between the access domain name and the address of the available resource in each reverse proxy, that is, in this embodiment, each reverse proxy is also virtualized, and each reverse proxy may maintain multiple forwarding lists. Compared with the granularity of dividing resources that is an infrastructure as a service layer in the prior art, the granularity of dividing resources is a reverse proxy when the resource manager provided in the embodiment of the present invention divides resources, so resource granularity is smaller, existing resources can be fully utilized, and a cost is low.

In the resource management system provided in the embodiment of the present invention, according to the consistent hash algorithm, the resource manager saves the correspondence between an address of each available resource and the access domain name in at least two virtual nodes of the specific factor, and there is certain redundancy in correspondences, so that when a certain reverse proxy fails to work and a service drops out, the work of the failed reverse proxy may be automatically transferred to other reverse proxies, so as to prevent the loss of the correspondence due to a single point failure, and further improve the reliability of a cloud computing system.

Furthermore, in the resource management system provided in the embodiment of the present invention, the available resource acquisition unit in the resource manager may include:

an index search module, configured to search for the resource index locally according to the resource requirement list;

a resource acquisition module, configured to, if the available resources are found, acquire addresses of at least two available resources, where the at least two available resources are located at different platform as a service layer devices, respectively;

a resource application module, configured to, if the available resources are not found, send a resource request message to a platform as a service layer device according to the resource requirement list, where the resource request message is used for requesting the platform as a service layer device to return addresses of at least two available resources; and an address receiving module, configured to receive the addresses of the at least two available resources returned by the platform as a service layer device.

In the resource management system provided in the embodiment of the present invention, the resource allocation request received by the requirement list acquisition unit in the resource manager further carries a service-level agreement of an application requesting allocation. That the available resource acquisition unit searches for the resource index locally according to the resource requirement list, and acquires the addresses of the at least two available resources specifically is: the available resource acquisition unit searches for the resource index locally according to a resource requirement list, and acquires the addresses of at least two currently available resources corresponding to the service-level agreement.

Persons of skilled in the art should understand that all or a part of the processes of the methods in the embodiments may be implemented by a computer program instructing relevant hardware. The program may be stored in a computer readable storage medium. When the program is run, the processes of the methods in the embodiments are performed. The storage medium may be a magnetic disk, an optical disk, a read-only memory (Read-Only Memory, ROM), a random access memory (Random Access Memory, RAM), and the like.

A resource management method, a resource management system and a resource manager provided in the embodiments of the present invention are introduced in detail above. Persons of ordinary skill in the art can make variations and modifications to the present invention in terms of the specific implementation and application scope according to the ideas of the embodiments of present invention. Therefore, the content of the specification shall not be construed as a limit to the present invention.

What is claimed is:

1. A resource management method, implemented by a resource manager, comprising:
    acquiring a resource allocation request, wherein the resource allocation request carries a resource requirement list and an access domain name of an application requesting allocation of resources;
    searching for a resource index locally according to the resource requirement list, and acquiring addresses of at least two available resources, wherein the at least two available resources are located at different platforms as service layer devices, respectively, and the at least two available resources both satisfy a resource requirement described by the resource requirement list; wherein the available resources include a combination of a computing resource and a storage resource;
    establishing a correspondence between an address of each available resource and the access domain name; and
    configuring at least two access routes according to the correspondence, wherein an access route is used for routing an access request accessing the access domain name to the available resource; wherein the configuring the at least two access routes according to the correspondence comprises:
    saving the correspondence between the access domain name and the address of each available resource in at least two reverse proxies; and
    saving a correspondence between each reverse proxy and the access domain name in at least two load balancers,
    wherein the saving the correspondence between the access domain name and the address of each available resource in each of the at least two reverse proxies comprises:
    dividing a reverse proxy into at least two virtual nodes according to a computing processing capability of the reverse proxy;
    hashing each virtual node to a specific interval according to a consistent hashing algorithm; and
    saving the correspondence between an address of each available resource and the access domain name in at least two virtual nodes of a specific factor.

2. The method according to claim 1, wherein the resource allocation request further carries a service-level agreement of the application requesting allocation;
    the searching for the resource index locally according to the resource requirement list and acquiring the addresses of the at least two available resources, comprises:
    searching for the resource index locally according to a resource requirement list, and acquiring addresses of at least two currently available resources corresponding to the service-level agreement.

3. The method according to claim 1, wherein the searching for the resource index locally according to the resource requirement list and acquiring the addresses of the at least two available resources, comprises:
    searching for the resource index locally according to the resource requirement list;
    if the available resources are found, acquiring the addresses of the at least two available resources;
    if the available resources are not found, sending a resource request message to a platform as a service layer device according to the resource requirement list, wherein the resource request message is used for requesting the platform as a service layer device to return the addresses of the at least two available resources; and
    receiving the addresses of the at least two available resources returned by the platform as a service layer device.

4. A resource manager, comprising:
    a storage device storing computer executable program code;
    a communication interface; and
    a processor, coupled to the storage device and the communication interface;
        wherein the program code comprises instructions which, when executed by the processor, cause the processor to:

acquire a resource allocation request, wherein the resource allocation request carries a resource requirement list and an access domain name of an application requesting allocation of resources;

search for a resource index locally according to the resource requirement list, and acquire addresses of at least two available resources, wherein the at least two available resources are located at different platforms as service layer devices, respectively, and the two available resources both satisfy a resource requirement described by the resource requirement list; wherein the available resources include a combination of a computing resource and a storage resource;

establish a correspondence between an address of each available resource and the access domain name; and configure at least two access routes according to the correspondence, wherein an access route is used for routing an access request accessing the domain name to the available resource; wherein configure at least two access routes according to the correspondence comprises:

save the correspondence between the access domain name and the address of each available resource in at least two reverse proxies; and save a correspondence between each reverse proxy and the access domain name in at least two load balancers, wherein save the correspondence between the access domain name and the address of each available resource in the at least two reverse proxies comprises:

divide a reverse proxy into at least two virtual nodes according to a computing processing capability of the reverse proxy; and hash each virtual node to a specific interval according to a consistent hash algorithm, and save the correspondence between an address of each available resource and the access domain name in at least two virtual nodes of a specific factor.

5. The resource manager according to claim 4, wherein search for a resource index locally according to the resource requirement list, and acquire addresses of at least two available resources comprises:

search for the resource index locally according to the resource requirement list;

if the available resources are found, acquire the addresses of the at least two available resources, wherein the at least two available resources are located at different platform as a service layer devices, respectively;

if the available resources are not found, send a resource request message to a platform as a service layer device according to the resource requirement list, wherein the resource request message is used for requesting the platform as a service layer device to return the addresses of the at least two available resources; and receive the addresses of the at least two available resources returned by the platform as a service layer device.

6. The resource manager according to claim 4, wherein the resource allocation request further carries a service-level agreement of the application requesting allocation;

that search for the resource index locally according to the resource requirement list, and acquire the addresses of the at least two available resources comprises that:

search for the resource index locally according to a resource requirement list, and acquire addresses of at least two currently available resources corresponding to the service-level agreement.

7. A resource management system, comprising:

the resource manager according to claim 4;

a load balancer, configured to route an access request to a corresponding reverse proxy according to a saved correspondence between a reverse proxy and an access domain name; and the reverse proxy, configured to route the access request to a corresponding available resource according to a saved correspondence between an access domain name and an address of an available resource.

8. A resource management system of a cloud computing system, comprising:

the resource manager according to claim 4;

and a load balancer, configured to route an access request to a corresponding reverse proxy according to a saved correspondence between a reverse proxy and an access domain name, wherein the reverse proxy, configured to route the access request to a corresponding available resource according to a saved correspondence between an access domain name and an address of an available resource.

* * * * *